US012710881B1

(12) United States Patent
Lien et al.

(10) Patent No.: US 12,710,881 B1
(45) Date of Patent: Aug. 18, 2026

(54) GROWN BAD BLOCK PROJECTION OF A MEMORY DEVICE USING FAST CYCLING

(71) Applicant: MICRON TECHNOLOGY, INC., Boise, ID (US)

(72) Inventors: Yu-Chung Lien, San Jose, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/073,648

(22) Filed: Mar. 7, 2025

(51) Int. Cl.
*G06F 3/06* (2006.01)

(52) U.S. Cl.
CPC ............ *G06F 3/0614* (2013.01); *G06F 3/064* (2013.01); *G06F 3/0653* (2013.01); *G06F 3/0679* (2013.01)

(58) Field of Classification Search
CPC ...... G06F 3/0614; G06F 3/0679; G06F 3/064; G06F 3/0653
See application file for complete search history.

(56) References Cited

U.S. PATENT DOCUMENTS

| | | | | |
|---|---|---|---|---|
| 7,770,079 | B2 * | 8/2010 | Radke | G06F 11/006 714/763 |
| 12,505,036 | B1 * | 12/2025 | Kumar N | G06F 12/0246 |
| 12,554,426 | B2 * | 2/2026 | Sandhu | G06F 3/064 |
| 2010/0275073 | A1 * | 10/2010 | Lasser | G11C 29/26 714/E11.159 |
| 2011/0239064 | A1 * | 9/2011 | Byom | G11C 29/10 714/E11.159 |
| 2015/0262712 | A1 * | 9/2015 | Chen | H03M 13/1108 714/723 |
| 2017/0294237 | A1 * | 10/2017 | Li | G11C 11/5628 |
| 2018/0060148 | A1 * | 3/2018 | Rudy | G06F 11/24 |
| 2021/0327532 | A1 * | 10/2021 | Kim | G11C 16/0483 |
| 2024/0055063 | A1 * | 2/2024 | Puthenthermadam | G11C 16/08 |

* cited by examiner

*Primary Examiner* — Mark A Giardino, Jr.
(74) *Attorney, Agent, or Firm* — Lowenstein Sandler LLP

(57) ABSTRACT

Whether a program erase cycle (PEC) count of a memory device matches a checkpoint value of a set of checkpoint values is determined. First type of cycling of the plurality of blocks of the memory device is performed using a test pattern responsive to determining that the PEC count matches the checkpoint value of the set of checkpoint values. A number of grown bad blocks for the checkpoint value is determined based on the first type of cycling of the plurality of blocks.

20 Claims, 4 Drawing Sheets

GROWN BAD BLOCK PROJECTION OF A MEMORY DEVICE USING FAST CYCLING

TECHNICAL FIELD

Embodiments of the disclosure relate generally to memory sub-systems, and more specifically, relate to grown bad block projections of a memory device using fast cycling.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1A:
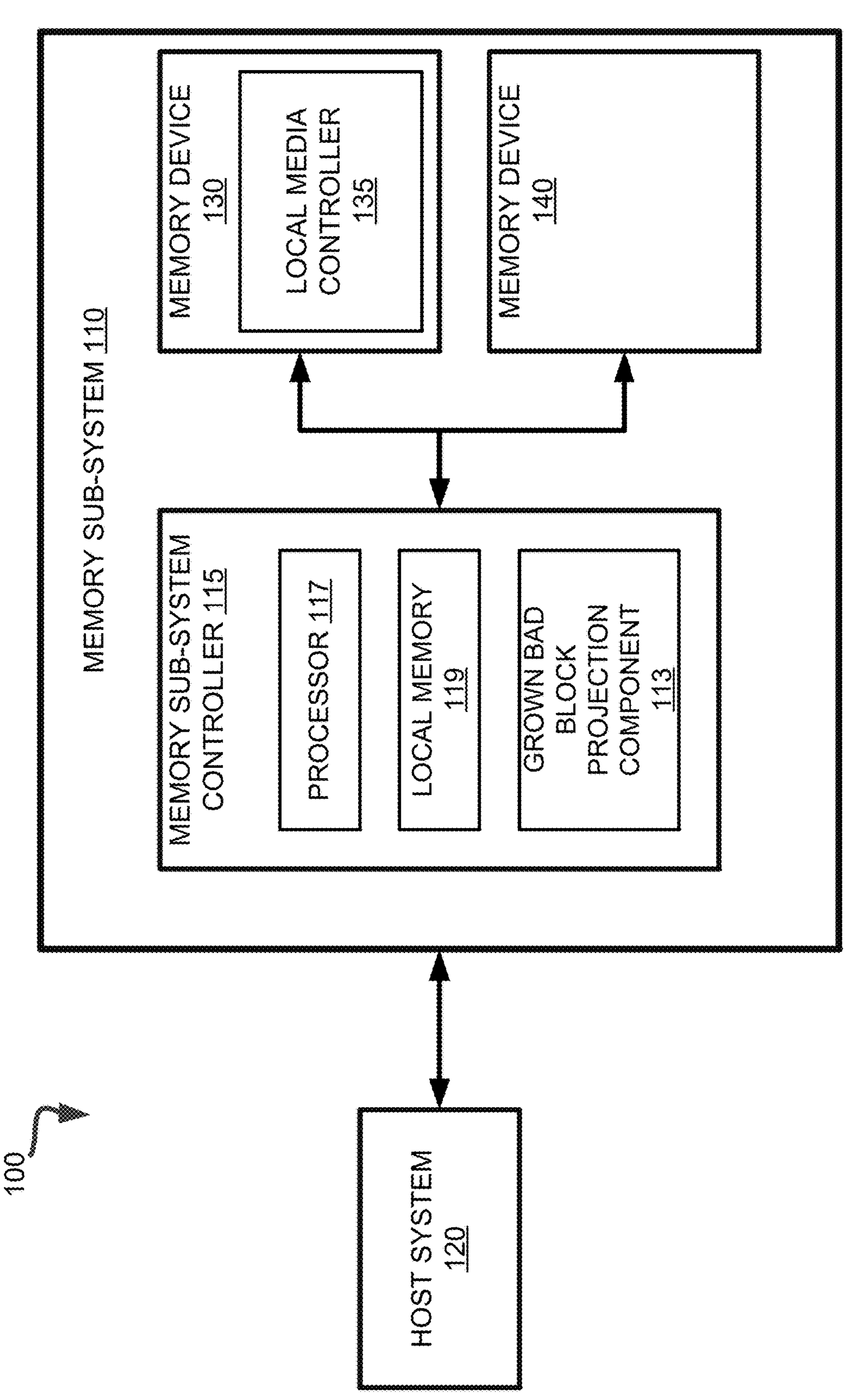
FIG. 1A illustrates an example computing system that includes a memory sub-system in accordance with one or more embodiments of the present disclosure.

Aspects of the present disclosure are directed to grown bad block projections of a memory device using fast cycling. A memory sub-system can be a storage device, a memory module, or a combination of a storage device and memory module. Examples of storage devices and memory modules are described below in conjunction with FIGS. 1A-1B. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative- and (NAND) memory device. Other examples of non-volatile memory devices are described below in conjunction with FIGS. 1A-1B. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

A memory device can include multiple memory cells arranged in a two-dimensional or three-dimensional grid. Memory cells are formed onto a silicon wafer in an array of columns and rows. A memory device can further include conductive lines connected to respective ones of the memory cells, referred to as wordlines and bitlines. A wordline can refer to one or more rows of memory cells of the memory device and a bitline can refer to one or more columns of memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

A memory cell can be programmed (written to) by applying a certain voltage to the memory cell, which results in an electric charge being held by the memory cell. For example, a voltage signal $V_{CG}$ that can be applied to a control electrode of the cell to open the cell to the flow of electric current across the cell, between a source electrode and a drain electrode. More specifically, for each individual memory cell (having a charge Q stored thereon) there can be a threshold control gate voltage $V_T$ (herein also referred to as the "threshold voltage" or simply as "threshold") such that the source-drain electric current is low for the control gate voltage ($V_{CG}$) being below the threshold voltage, $V_{CG}<V_T$. The current increases substantially once the control gate voltage has exceeded the threshold voltage, $V_{CG}>V_T$. Because the actual geometry of the electrodes and gates varies from cell to cell, the threshold voltages can be different even for cells implemented on the same die. The memory cells can, therefore, be characterized by a distribution P of the threshold voltages, $P(Q,V_T)=dW/dV_T$, where dW represents the probability that any given cell has its threshold voltage within the interval $[V_T, V_T+dV_T]$ when charge Q is placed on the cell.

A memory device can have distributions $P(Q, V_T)$ that are narrow compared with the working range of control voltages tolerated by the cells of the device. Accordingly, multiple non-overlapping distributions $P(Q_k, V_T)$ ("valleys") can be fit into the working range allowing for storage and reliable detection of multiple values of the charge $Q_k$, k=1, 2, 3 . . . . The distributions (valleys) are interspersed with voltage intervals ("valley margins") where none (or very few) of the memory cells of the device have their threshold voltages. Such valley margins can, therefore, be used to separate various charge states $Q_k$—the logical state of the cell can be determined by detecting, during a read operation, between which two valley margins the respective threshold voltage $V_T$ of the cell resides. This effectively allows a single memory cell to store multiple bits of information: a memory cell operated with 2N−1 well-defined valley margins and 2N valleys is capable of reliably storing N bits of information. Specifically, the read operation can be performed by comparing the measured threshold voltage $V_T$ exhibited by the memory cell to one or more reference voltage levels corresponding to known valley margins (e.g., centers of the margins) of the memory device.

One type of memory cell ("cell") is a single level cell (SLC), which stores 1 bit per cell and defines 2 data states ("states") ("1" or "L0" and "0" or "L1") each corresponding to a respective $V_T$ level. For example, the "1" state can be an erased state and the "0" state can be a programmed state (L1). Another type of cell is a multi-level cell (MLC), which stores 2 bits per cell and defines 4 states ("11" or "L0", "10" or "L1", "01" or "L2" and "00" or "L3") each corresponding to a respective $V_T$ level. For example, the "11" state can be an erased state and the "01", "10" and "00" states can each be a respective programmed state. Another type of cell is a triple level cell (TLC), which stores 3 bits per cell and defines 8 states ("111" or "L0", "110" or "L1", "101" or "L2", "100" or "L3", "011" or "L4", "010" or "L5", "001" or "L6", and "000" or "L7") each corresponding to a respective $V_T$ level. For example, the "111" state can be an erased state and each of the other states can be a respective programmed state. Another type of a cell is a quad-level cell (QLC), which stores 4 bits per cell and defines 16 states L0-L15, where L0 corresponds to "1111" and L15 corresponds to "0000". Another type of cell is a penta-level cell (PLC), which stores 5 bits per cell and defines 32 states. Other types of cells are also contemplated. Thus, an n-level cell can use $2^n$ levels of charge to store n bits. A memory device can include one or more arrays of memory cells such as SLCs, MLCs, TLCs, QLCs, PLCs, etc. or any combination of such. For example, a memory device can include an SLC portion, and an MLC portion, a TLC portion, a QLC portion, or a PLC portion of memory cells.

Block budgeting refers to the allocation and management of memory blocks in a memory device. Block budgeting encompasses allocation of memory blocks by dividing the total memory capacity among user data space, system blocks, spare blocks, and over-provisioning. Memory blocks can be categorized and managed as factory bad blocks present at manufacture, grown bad blocks that develop during device operation, reserved blocks for system operations, and active user data blocks. Block budgeting impacts write amplification by determining over-provisioning space, defects per million (DPM) through spare block allocation, chip size based on total block requirements, and cost due to added memory for spare blocks.

During block budgeting, the total block count determined by memory device capacity, factory bad blocks identified through device testing, system blocks defined by firmware requirements, and user data blocks calculated from advertised capacity are known values. However, grown bad blocks that develop during device operation are unknown and are typically estimated based on statistical data, reliability models, and empirical testing of similar memory devices. While performing normal cycling operations on the entire memory device during manufacturing would provide an accurate representation of grown bad blocks the memory device will experience during operation, this approach is impractical due to extensive test time, manufacturing costs, and reduced memory device lifetime. Accordingly, there is a need for accurately projecting grown bad blocks in memory devices to enable optimal block budgeting. The inability to accurately project grown bad blocks create significant design challenges, as inaccurate block budgeting can result in either over-provisioning or under-provisioning of blocks.

Aspects of the present disclosure address the above and other deficiencies by providing a memory sub-system that estimates, using fast cycling, a number of grown bad blocks that will develop during operation of memory device. After each (program erase cycle (PEC) of the plurality of blocks of the memory device, the memory sub-system controller can determine whether a current PEC count matches a checkpoint value of a set of checkpoint values. A PEC refers to the process of writing (programming) data and then erasing such data. Each checkpoint value represents a target PEC count at which to perform normal cycling. Normal cycling comprises erasing the plurality of blocks of the memory device, writing a test pattern (e.g., a predetermined sequence of bits) to the plurality of blocks, and reading the plurality of blocks.

In response to determining that the current PEC does not match a checkpoint value of the set of checkpoint values, the memory sub-system controller can perform fast cycling. Fast cycling comprises writing the test pattern to the plurality of blocks and erasing the plurality of blocks. In some embodiments, fast cycling may be performed using a predetermined fast cycling trim (i.e., a configuration setting) which includes at least one of an erase voltage, a programming voltage, and/or a cycle count. The predetermined fast cycling trim emulates the normal cycling near end of life of the memory device (e.g., by using the erase voltage of the normal cycling near end of life of the memory device).

In response to determining that the current PEC matches a checkpoint value of the set of checkpoint values, the memory sub-system controller can perform normal cycling on the plurality of blocks of the memory device to obtain a count of grown bad blocks. The count of grown bad blocks can be obtained by incrementing the count of grown bad blocks each time an operation (e.g., erasing, writing, or reading) of the normal cycling experiences a failure condition. The failure condition can include an error during erasing a block of the plurality of blocks, an error during writing a block of the plurality of blocks, or a block of the plurality of blocks experiencing a high raw bit error rate (RBER) from reading (i.e., a RBER exceeding a predefined threshold value).

After performing the normal cycling, the memory sub-system controller can determine whether the PEC count matches a largest checkpoint value of the set of checkpoint values (or if the set of checkpoint values are in ascending order whether the PEC count matches a last checkpoint value of the set of checkpoint values). If the PEC count does not match the largest checkpoint value (or the last checkpoint value), fast cycling is performed on the plurality of blocks of the memory device. Otherwise, the process is concluded and the count of grown bad blocks at each checkpoint value of the set of checkpoint values has been obtained.

Advantages of the present disclosure include, but are not limited to, thereby providing an accurate representation of grown bad blocks the memory device will experience during operation for block budgeting while decreasing test time, thereby improving cost, performance, and reliability of the memory device.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe or CXL bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not- and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not- or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a grown bad block projection component 113 that estimates a number of grown bad blocks that will develop during operation of memory device 130 and/or 140. In some embodiments, the memory sub-system controller 115 includes at least a portion of the grown bad block projection component 113. In some embodiments, the grown bad block projection component 113 is part of the host system 120, an application, or an operating system. In other embodiments, local media controller 135 includes at least a portion of grown bad block projection component 113 and is configured to perform the functionality described herein.

In some embodiments, the grown bad block projection component 113, at a beginning of life of the memory device 130 and/or 140, obtains a set of checkpoint values. The set of checkpoint values includes one or more checkpoint values. Each checkpoint value of the set of checkpoint values is represented as a numerical value and represents a target program erase cycle count of the memory device at which normal cycling is to be performed on the memory device 130 and/or 140. In some embodiments, the set of checkpoint values may include an expected end of life (represented as a program erase cycle (PEC) count) for various variants of the memory device. In other words, each checkpoint value of the set of checkpoint values may refer to an expected end of life (represented as a program erase cycle (PEC) count) for a specific variant of the various variants of the memory device. For example, a first variant of the memory device may have an expected end of life of 3,000 PECs, a second variant of the memory device may have an expected end of life of 5,000 PECs, a third variant of the memory device may have an expected end of life of 10,000 PECs. Thus, the set of checkpoint values would include 3,000; 5,000; and 10,000.

Normal cycling comprises a series of operations (e.g., an erase operation, a programming operation, and a read operation). The erase operation of the normal cycling includes erasing, using a predetermined erase voltage, the plurality of blocks of the memory device. The programming operation of the normal cycling includes writing, using a predetermined programming voltage, a test pattern to the plurality of blocks. The test pattern refers to a predetermined sequence of bits used to verify operational characteristics, detect potential defects, and evaluate performance parameters. The read operation includes reading the plurality of blocks.

The grown bad block projection component 113 obtains a PEC count of the memory device. The PEC count of the memory device refers to a numerical number that represents a number of times the plurality of blocks of the memory device has been programmed and then erased. The grown bad block projection component 113 determines whether the PEC count of the memory device matches a checkpoint value of the set of checkpoint values. In particular, a numerical number associated with the PEC count matches a numerical number of a checkpoint value of the set of checkpoint values.

If the PEC count does not match a checkpoint value of the set of checkpoint values, the grown bad block projection component 113 performs fast cycling on the memory device 130 and/or 140. Fast cycling comprises a series of operations (e.g., a programming operation and an erase operation). In some embodiments, fast cycling is performed using a predetermined fast cycling trim. The predetermined fast cycling trim may include at least one of an erase voltage, a programming voltage, or a cycle count. The erase voltage of the fast cycling refers to an erase voltage that emulates the predetermined erase voltage of the normal cycling near end of life of the memory device 130 and/or 140. The programming voltage of the fast cycling refers to a programming voltage that emulates the predetermined programming volage of the normal cycling near end of life of the memory device 130 and/or 140. Similarly, the cycle count of the fast cycling refers to a cycle count that emulates a predetermined cycle count of the normal cycling near end of life of the memory device 130 and/or 140. In some embodiments, the erase voltage of the fast cycling and the programming voltage of the fast cycling may be higher than the predetermined erase voltage of the normal cycling. In some embodiments, the predetermined programming voltage of the normal cycling. In some embodiments, the cycle count of the fast cycling may be less than the predetermined cycle count of the normal cycling. Thus, a threshold voltage distribution for fast cycling would be well aligned with a threshold voltage distribution for normal cycling.

To performs fast cycling, using the predetermined fast cycling trim, on the plurality of blocks of the memory device 130 and/or 140, the grown bad block projection component 113 programs, using the programming voltage of the predetermined fast cycling trim, a test pattern to each block of the plurality of blocks. Once the plurality of blocks is programmed with the test pattern, the grown bad block projection component 113 erase each block of the plurality of blocks using the erase voltage of the predetermined fast cycling trim. Once fact cycling is complete, the PEC count increases by 1. The grown bad block projection component 113 repeats the process by determining whether the PEC count matches a checkpoint value and performs normal cycling or fast cycling based on the whether the PEC count matches the checkpoint value or not.

If the PEC count matches a checkpoint value of the set of checkpoint values (e.g., a matching checkpoint value), the grown bad block projection component 113 performs normal cycling on the memory device 130 and/or 140. As previously described, the grown bad block projection component 113 erases, using the predetermined erase volage of the normal cycling, each block of the plurality of blocks. Once the plurality of blocks is erased, the grown bad block projection component 113 programs, using the predetermined programming volage of the normal cycling, each block of the plurality of blocks with the test pattern. Once the plurality of blocks is programmed with the test pattern, the grown bad block projection component 113 read each block of the plurality of blocks. During each operation of the series of operations associated with normal cycling of the plurality of blocks, the grown bad block projection component 113 determines whether a failure condition as occurred. In some embodiment, a failure condition can include an error during erasing of a block (e.g., an erase failure), an error during programming of a block (e.g., a programming failure), or experience during reading a raw bit error rate (RBER) exceeding a predetermined threshold (indicating a high RBER). For each failure condition that occurred during an operation of the series of operations associated with normal cycling of the plurality of blocks, the grown bad block projection component 113 increments a number of grown bad block count. The number of grown bad block count starts at zero for each matching checkpoint value. After determining the number of grown bad block count has been determined, the grown bad block projection component 113 stores the number of grown bad block count and the matching checkpoint value. Once normal cycling is complete, the PEC count increases by 1. The grown bad block projection component 113 determines whether the increased PEC count matches a largest checkpoint value of the set of checkpoint values. If the increased PEC count matches the largest checkpoint value of the set of checkpoint values, the grown bad block projection component 113 concludes estimating the number of grown bad blocks that will develop during operation of memory device 130 and/or 140. Otherwise, the grown bad block projection component 113 repeats fast cycling on the plurality of blocks. In some embodiments, the set of checkpoint values may be in ascending order, thus rather than checking whether the PEC count matches the largest checkpoint value, the grown bad block projection component 113 may determine whether the PEC count matches a last checkpoint value in the set of checkpoint values.

In other words, fast cycling is repeatedly performed on the plurality of blocks of the memory device 130 and/or 140 until a PEC count of the memory device 130 and/or 140 matches a checkpoint value of the set of checkpoint values. At which point, normal cycling is performed on the plurality of blocks of the memory device 130 and/or 140 to obtain a count of grown bad blocks for the PEC count in response a failure condition during one or more operations of the normal cycling. If the PEC count matches the largest checkpoint value of the set of checkpoint values, the process is concluded. Otherwise, fast cycling is repeatedly performed until the PEC count of the memory device 130 and/or 140 matches another checkpoint value of the set of checkpoint values to initiate normal cycling.

Figure 1B:
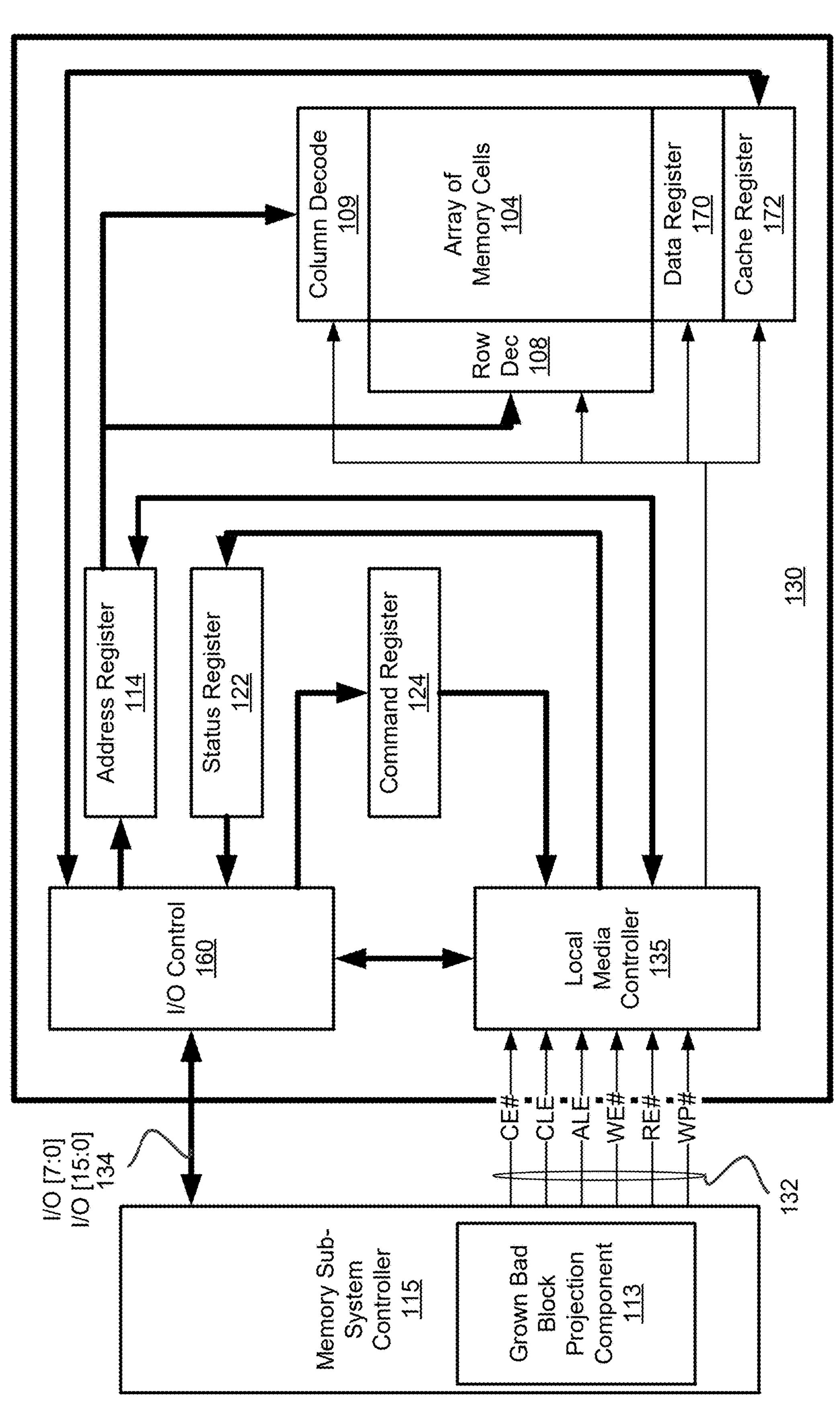
FIG. 1B is a block diagram of a memory device in communication with a memory sub-system controller of a memory sub-system, in accordance with one or more embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. The memory sub-system controller 115, as previously described, includes grown bad a block projection component 113 (e.g., grown bad block projection component 113 of FIG. 1A). Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are connected to the same access line (e.g., a wordline) while memory cells of a logical column are selectively connected to the same data line (e.g., a bitline). A single access line may be associated with more than one logical row of memory cells and a single data line may be associated with more than one logical column. Memory cells (not shown in FIG. 1B) of at least a portion of array of memory cells 104 are capable of being programmed to one of at least two target data sta.

Row decode circuitry 108 and column decode circuitry 110 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 110 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 110 to control the row decode circuitry 108 and column decode circuitry 110 in response to the addresses. In one embodiment, local media controller 135 includes the CP component 137, which can implement the defect detection described herein during an erase operation on memory device 130.

The local media controller 135 is also in communication with a cache register 118. Cache register 118 latches data, either incoming or outgoing, as directed by the local media controller 135 to temporarily store data while the array of memory cells 104 is busy writing or reading, respectively, other data. During a program operation (e.g., write operation), data may be passed from the cache register 118 to the data register 170 for transfer to the array of memory cells 104; then new data may be latched in the cache register 118 from the I/O control circuitry 160. During a read operation, data may be passed from the cache register 118 to the I/O control circuitry 160 for output to the memory sub-system controller 115; then new data may be passed from the data register 170 to the cache register 118. The cache register 118 and/or the data register 170 may form (e.g., may form a portion of) a page buffer of the memory device 130. A page buffer may further include sensing devices (not shown in FIG. 1B) to sense a data state of a memory cell of the array of memory cells 204, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands may be received over input/output (I/O) pins [7:0] of I/O bus 136 at I/O control circuitry 160 and may then be written into command register 124. The addresses may be received over input/output (I/O) pins [7:0] of I/O bus 136 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 118. The data may be subsequently written into data register 170 for programming the array of memory cells 104.

In an embodiment, cache register 118 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIGS. 1A-1B has been simplified. It should be recognized that the functionality of the various block components described with reference to FIGS. 1A-1B may not necessarily be segregated to distinct components or component portions of an integrated circuit device. For example, a single component or component portion of an integrated circuit device could be adapted to perform the functionality of more than one block component of FIGS. 1A-1B. Alternatively, one or more components or component portions of an integrated circuit device could be combined to perform the functionality of a single block component of FIGS. 1A-1B. Additionally, while specific I/O pins are described in accordance with popular conventions for receipt and output of the various signals, it is noted that other combinations or numbers of I/O pins (or other I/O node structures) may be used in the various embodiments.

Figure 2:
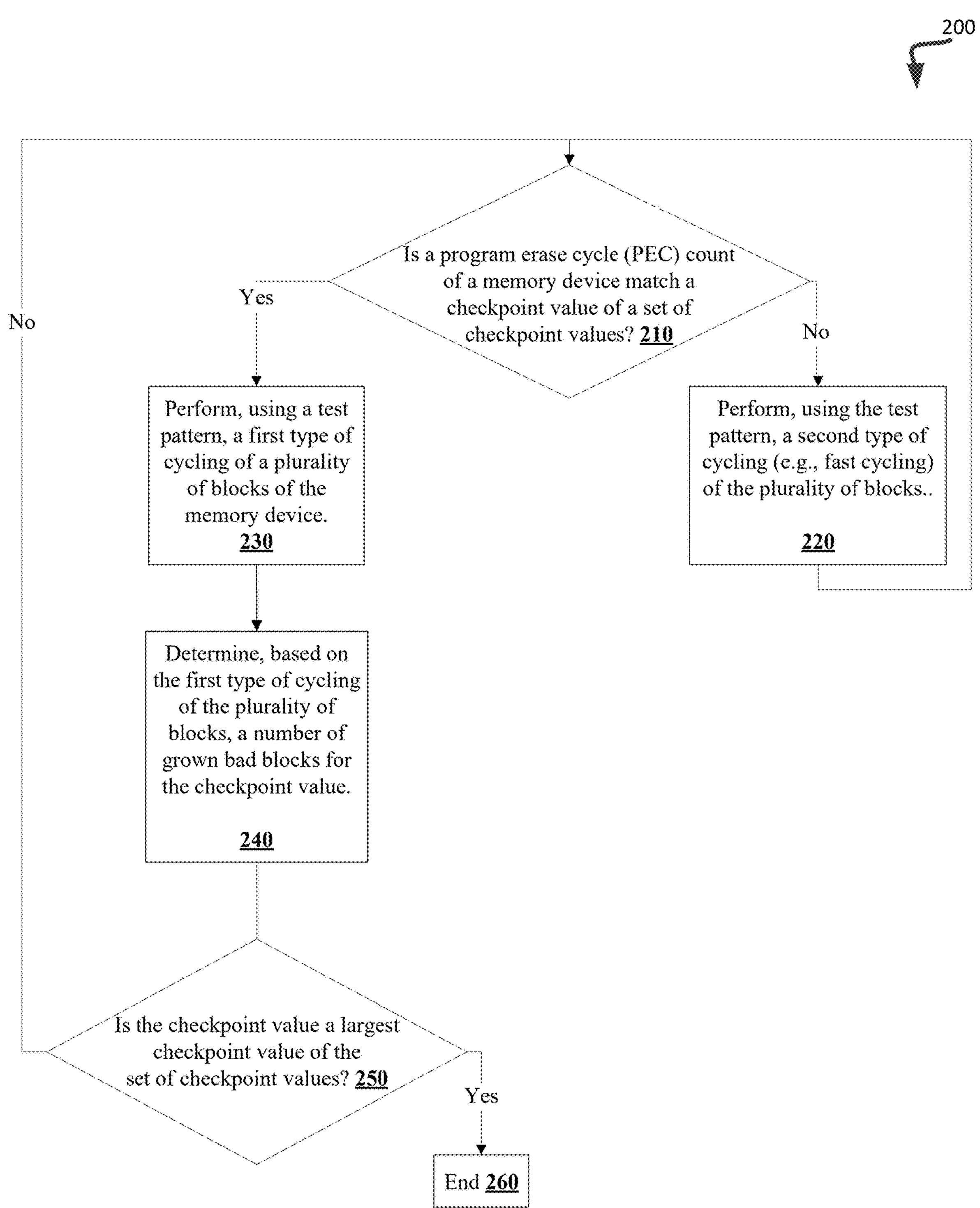
FIG. 2 is a flow diagram of an example method to grown bad block projections of a memory device using fast cycling, in accordance with some embodiments of the present disclosure.

FIG. 2 is a flow diagram of an example method to grown bad block projections of a memory device using fast cycling, in accordance with one or more embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by grown bad block projection component 113 of FIGS. 1A and 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic determines whether a program erase cycle (PEC) count of a memory device, such as memory device 130, matches a checkpoint value of a set of checkpoint values. Each checkpoint value of the set of checkpoint values may be a numerical value representing a target PEC count to perform a first type of cycling (e.g., normal cycling) of the plurality of blocks of the memory device.

If the PEC count does not match a checkpoint value of the set of checkpoint values, at operation 220, the processing logic performs, using the test pattern, a second type of cycling (e.g., fast cycling) of the plurality of blocks. The second type of cycling (e.g., fast cycling) may include writing the test pattern to the plurality of blocks and erasing the plurality of blocks.

If the PEC count does match a checkpoint value of the set of checkpoint values, at operation 230, the processing logic performs, using a test pattern, a first type of cycling of a plurality of blocks of the memory device. The first type of cycling (e.g., normal cycling) may include erasing each block of the plurality of blocks, programming each block of the plurality of blocks with a test pattern (e.g., a predetermined sequence of bits), and reading each block of the plurality of blocks.

At operation 240, the processing logic determines, based on the first type of cycling of the plurality of blocks, a number of grown bad blocks for the checkpoint value. To determine the number of grown bad blocks for the checkpoint value, the processing logic increments a counter representing the number of grown bad blocks for each block of the plurality of blocks that experienced a failure condition in response to the first type of cycling. In some embodiments, a failure condition experienced by a block may include an error during erasing the block (e.g., erase failure), an error during programming the block (e.g., a programming failure), or a raw bit error rate from reading the block that exceeds a predetermined threshold. In other words, the processing logic obtains at each checkpoint value (or PEC of the memory device) a number of grown bad blocks for the memory device at the respective checkpoint value (or PEC of the memory device).

At operation 250, the processing logic determines whether the checkpoint value is the largest checkpoint value of the set of checkpoint values. Depending on the embodiment, the set of checkpoint values may be in ascending order. Thus, rather than determining whether the checkpoint value is the largest checkpoint value, the processing logic determines whether the checkpoint value is a last checkpoint value which is the largest checkpoint value.

If the checkpoint value is not the largest checkpoint value of the set of checkpoint values, at operation 240, the processing logic proceeds to operation 210. Otherwise, if the checkpoint value is the largest checkpoint value of the set of checkpoint values, at operation 260, the processing logic ends.

Figure 3:
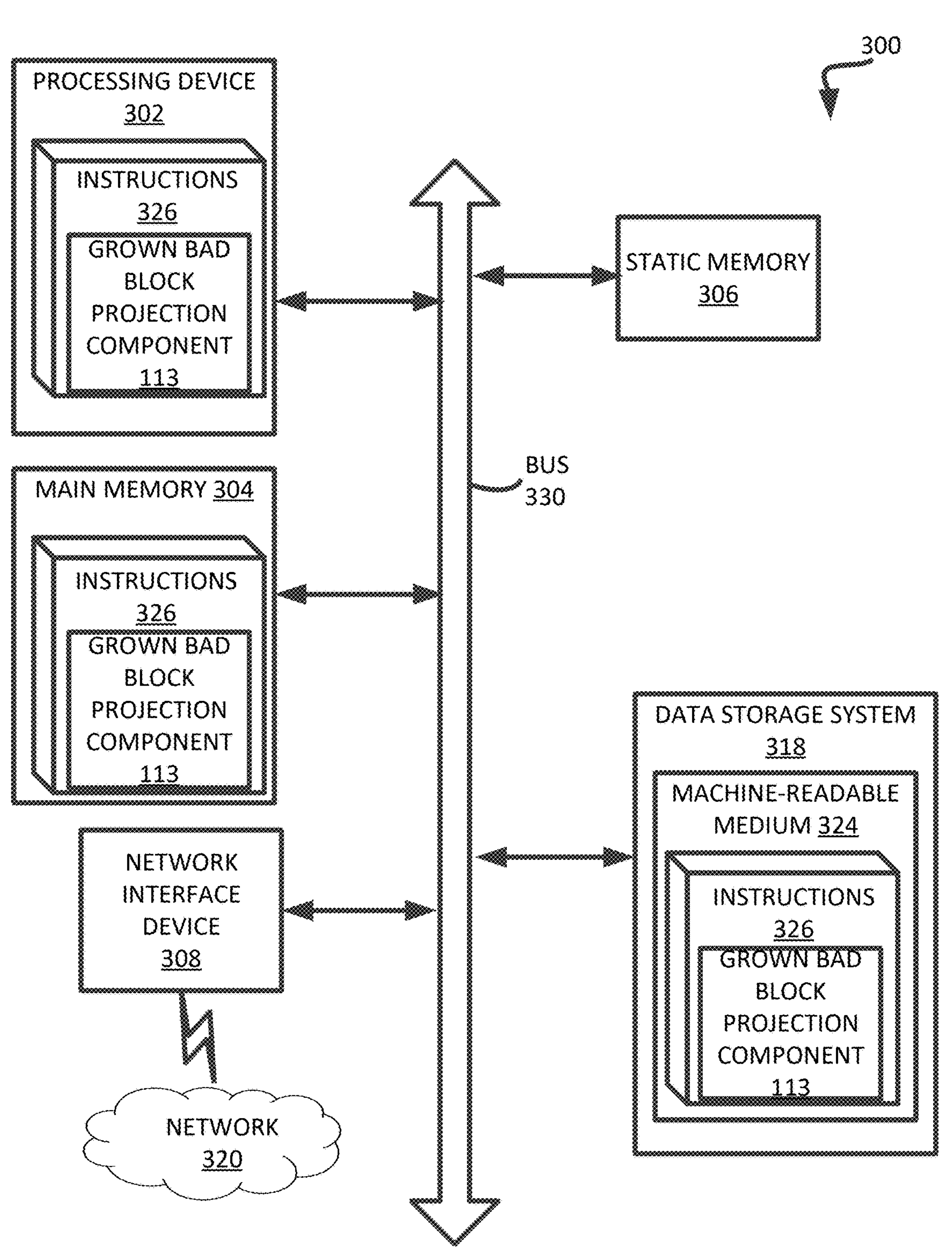
FIG. 3 is a block diagram of an example computer system in which embodiments of the present disclosure may operate.

FIG. 3 illustrates an example machine of a computer system 300 within which a set of instructions, for causing the machine to perform any one or more of the methodologies discussed herein, can be executed. In some embodiments, the computer system 300 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the grown bad block projection component 113 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 300 includes a processing device 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage system 318, which communicate with each other via a bus 330.

Processing device 302 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 302 can also be one or more special-purpose processing devices such as an application specific integrated circuit (ASIC), a field programmable gate array (FPGA), a digital signal processor (DSP), network processor, or the like. The processing device 302 is configured to execute instructions 326 for performing the operations and steps discussed herein. The computer system 300 can further include a network interface device 308 to communicate over the network 320.

The data storage system 318 can include a machine-readable storage medium 324 (also known as a computer-readable medium) on which is stored one or more sets of instructions 326 or software embodying any one or more of the methodologies or functions described herein. The instructions 326 can also reside, completely or at least partially, within the main memory 304 and/or within the processing device 302 during execution thereof by the computer system 300, the main memory 304 and the processing device 302 also constituting machine-readable storage media. The machine-readable storage medium 324, data storage system 318, and/or main memory 304 can correspond to the memory sub-system 110 of FIG. 1A.

In one embodiment, the instructions 326 include instructions to implement functionality corresponding to the grown bad block projection component 113 of FIG. 1A). While the machine-readable storage medium 324 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

determining whether a program erase cycle (PEC) count of a memory device matches a checkpoint value of a set of checkpoint values;

responsive to determining that the PEC count matches the checkpoint value of the set of checkpoint values, performing, using a test pattern, a first type of cycling of a plurality of blocks of the memory device; and determining, based on the first type of cycling of the plurality of blocks, a number of grown bad blocks for the checkpoint value.

2. The method of claim 1, wherein each checkpoint value of the set of checkpoint values is a numerical value representing a target PEC count to perform a first type of cycling of the plurality of blocks of the memory device.

3. The method of claim 1, wherein performing the first type of cycling of plurality of blocks comprises:

erasing each block of the plurality of blocks;

programming each erased block with the test pattern; and reading each programmed block.

4. The method of claim 1, wherein determining, based on the first type of cycling of the plurality of blocks, the number of grown bad blocks comprises:

for each block of the plurality of blocks experiencing a failure condition in response to the first type of cycling, incrementing the number of grown bad blocks.

5. The method of claim 4, wherein the failure condition in response to the first type of cycling includes at least one of an erase failure, a programming failure, or a raw bit error rate exceeding a predetermined threshold.

6. The method of claim 1, further comprising:

determining whether the checkpoint value is a largest checkpoint value of the set of checkpoint values; and responsive to determining that the checkpoint value is not the largest checkpoint value of the set of checkpoint values, performing a second type of cycling of the plurality of blocks, wherein the second type of cycling comprises programming the plurality of blocks with the test pattern and erasing the plurality of blocks.

7. The method of claim 1, further comprising:

responsive to determining that the PEC count does not match a checkpoint value of the set of checkpoint values, performing a second type of cycling of the plurality of blocks.

8. A system comprising:

a memory device; and a processing device coupled to the memory device, the processing device to perform operations comprising:

determining whether a program erase cycle (PEC) count of the memory device matches a checkpoint value of a set of checkpoint values;

responsive to determining that the PEC count matches the checkpoint value of the set of checkpoint values, performing, using a test pattern, a first type of cycling of a plurality of blocks of the memory device; and determining, based on the first type of cycling of the plurality of blocks, a number of grown bad blocks for the checkpoint value.

9. The system of claim 8, wherein each checkpoint value of the set of checkpoint values is a numerical value representing a target PEC count to perform a first type of cycling of the plurality of blocks of the memory device.

10. The system of claim 8, wherein performing the first type of cycling of plurality of blocks comprises:

erasing each block of the plurality of blocks;

programming each erased block with the test pattern; and reading each programmed block.

11. The system of claim 8, wherein determining, based on the first type of cycling of the plurality of blocks, the number of grown bad blocks comprises:

for each block of the plurality of blocks experiencing a failure condition in response to the first type of cycling, incrementing the number of grown bad blocks.

12. The system of claim 11, wherein the failure condition in response to the first type of cycling includes at least one of an erase failure, a programming failure, or a raw bit error rate exceeding a predetermined threshold.

13. The system of claim 8, wherein the processing device is to perform operations further comprising:

determining whether the checkpoint value is a largest checkpoint value of the set of checkpoint values; and responsive to determining that the checkpoint value is not the largest checkpoint value of the set of checkpoint values, performing a second type of cycling of the plurality of blocks, wherein the second type of cycling comprises programming the plurality of blocks with the test pattern and erasing the plurality of blocks.

14. The system of claim 8, wherein the processing device is to perform operations further comprising:

responsive to determining that the PEC count does not match a checkpoint value of the set of checkpoint values, performing a second type of cycling of the plurality of blocks.

15. A non-transitory computer-readable storage medium comprising instructions that, when executed by a processing device, cause the processing device to perform operations comprising:

determining whether a program erase cycle (PEC) count of a memory device matches a checkpoint value of a set of checkpoint values;

responsive to determining that the PEC count matches the checkpoint value of the set of checkpoint values, performing, using a test pattern, a first type of cycling of a plurality of blocks of the memory device;

determining, based on the first type of cycling of the plurality of blocks, a number of grown bad blocks for the checkpoint value; and responsive to determining that the PEC count does not match a checkpoint value of the set of checkpoint values, performing, using the test pattern, a second type of cycling of the plurality of blocks.

16. The non-transitory computer-readable storage medium of claim 15, wherein each checkpoint value of the set of checkpoint values is a numerical value representing a target PEC count to perform a first type of cycling of the plurality of blocks of the memory device.

17. The non-transitory computer-readable storage medium of claim 15, wherein determining, based on the first type of cycling of the plurality of blocks, the number of grown bad blocks comprises:

for each block of the plurality of blocks experiencing a failure condition in response to the first type of cycling, incrementing the number of grown bad blocks.

18. The non-transitory computer-readable storage medium of claim 17, wherein the failure condition in response to the first type of cycling includes at least one of an erase failure, a programming failure, or a raw bit error rate exceeding a predetermined threshold.

19. The non-transitory computer-readable storage medium of claim 18, wherein first type of cycling comprises erasing the plurality of blocks, programming the plurality of blocks with the test pattern, and reading the plurality of blocks, and wherein the second type of cycling comprises programming the plurality of blocks with the test pattern, and erasing the plurality of blocks.

20. The non-transitory computer-readable storage medium of claim 15, wherein the processing device is to perform operations further comprising:

determining whether the checkpoint value is a largest checkpoint value of the set of checkpoint values; and responsive to determining that the checkpoint value is not the largest checkpoint value of the set of checkpoint values, performing a second type of cycling of the plurality of blocks, wherein the second type of cycling comprises programming the plurality of blocks with the test pattern and erasing the plurality of blocks.

* * * * *